United States Patent
Ceotto et al.

(10) Patent No.: US 12,029,342 B2
(45) Date of Patent: Jul. 9, 2024

(54) COFFEE MACHINE AND RELATIVE CONTROL METHOD

(71) Applicant: CMA MACCHINE PER CAFFE' S.r.l., Susegana (IT)

(72) Inventors: Beppino Ceotto, Silea (IT); Giovanni Rossetto, Conegliano (IT)

(*) Notice: Subject to any disclaimer, the term of this patent is extended or adjusted under 35 U.S.C. 154(b) by 0 days.

(21) Appl. No.: 15/119,797

(22) PCT Filed: Feb. 18, 2015

(86) PCT No.: PCT/EP2015/053361
§ 371 (c)(1),
(2) Date: Aug. 18, 2016

(87) PCT Pub. No.: WO2015/124592
PCT Pub. Date: Aug. 27, 2015

(65) Prior Publication Data
US 2017/0049259 A1    Feb. 23, 2017

(30) Foreign Application Priority Data
Feb. 20, 2014  (IT) .......................... MI2014A000249

(51) Int. Cl.
*A47J 31/00* (2006.01)
*A47J 31/36* (2006.01)
*A47J 31/52* (2006.01)

(52) U.S. Cl.
CPC .............. *A47J 31/002* (2013.01); *A47J 31/36* (2013.01); *A47J 31/52* (2013.01); *A47J 31/5255* (2018.08)

(58) Field of Classification Search
CPC ...... A47J 31/00; A47J 31/002; A47J 31/5255; A47J 31/36; A47J 31/46; A47J 31/461; A47J 31/469; A47J 31/52
(Continued)

(56) References Cited

U.S. PATENT DOCUMENTS 5,255,593 A * 10/1993 Bunn ..................... A47J 31/002
99/280
6,779,435 B1 * 8/2004 Iacobucci ............. A47J 31/005
392/449
(Continued)

FOREIGN PATENT DOCUMENTS

CN        101094602        12/2007
CN        102038431         5/2011
(Continued)

OTHER PUBLICATIONS

Italian Search Report of Italian priority application No. ITMI2014A000249 issued on Oct. 22, 2014.
(Continued)

*Primary Examiner* — Nathaniel E Wiehe
*Assistant Examiner* — Spencer H. Kirkwood
(74) *Attorney, Agent, or Firm* — Themis Law

(57) ABSTRACT

The coffee machine comprises at least one hydraulic infusion circuit comprising at least one feed pump (2) for supplying water, at least one boiler (3) hydraulically connected to the feed pump (2) by cascade connection, at least one infusion unit (4) that is hydraulically connected to the boiler (3) by cascade connection and through which a flow rate of hot water can pass for execution of an infusion cycle, means for regulating the flow rate of the water, means for measuring said flow rate of the water, and a feedback controller (6) connected to the regulating means and to the measuring means and configured to compare in real time the current value of the flow rate of the water, as measured by the measuring means, with a corresponding reference value, and to control the regulating means so as to eliminate any deviation of the current value with respect to the corresponding reference value.

7 Claims, 2 Drawing Sheets

Figure 1:
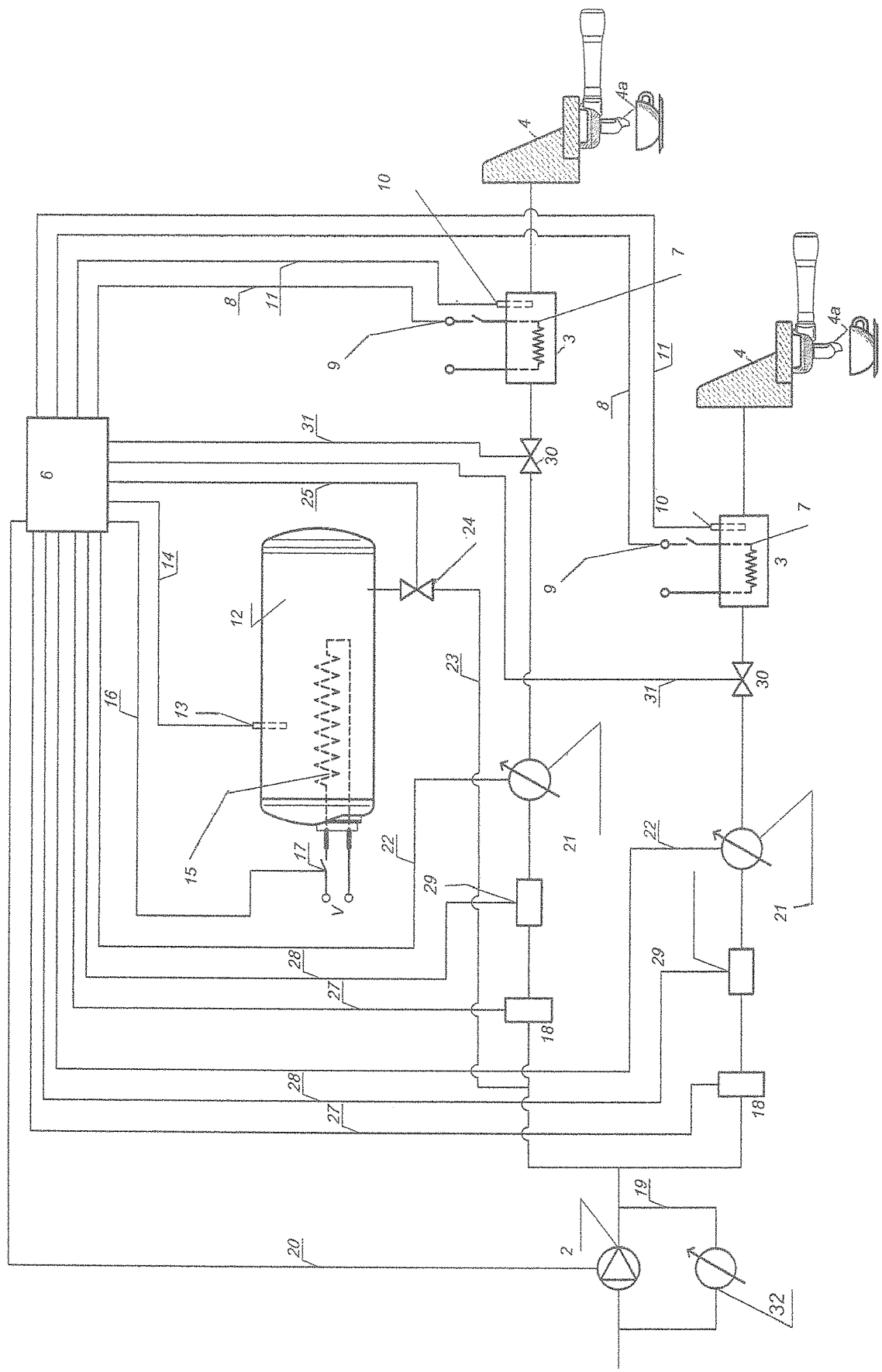

(58) Field of Classification Search
USPC .......................................................... 99/279
See application file for complete search history.

(56) References Cited

U.S. PATENT DOCUMENTS

| | | | |
|---|---|---|---|
| 8,124,150 B2* | 2/2012 | Doglioni Majer .. | A47J 31/3609 426/590 |
| 9,357,871 B2* | 6/2016 | Coccia ................ | A47J 31/5255 |
| 9,993,106 B2* | 6/2018 | Majer .................. | A47J 31/469 |
| 2008/0050480 A1* | 2/2008 | Doglioni Majer .... | A47J 31/525 99/280 |
| 2008/0148954 A1* | 6/2008 | Maldanis ............. | A47J 31/58 99/279 |
| 2009/0194361 A1* | 8/2009 | Eisenbarth ........... | B62D 5/064 180/422 |
| 2011/0094389 A1* | 4/2011 | Coccia ................. | A47J 31/36 99/280 |
| 2014/0069279 A1* | 3/2014 | Upston ................ | A47J 31/4403 99/283 |
| 2017/0216697 A1* | 8/2017 | Cameron ............. | F04F 5/12 |

FOREIGN PATENT DOCUMENTS

| | | | | |
|---|---|---|---|---|
| CN | 102869291 A | * | 1/2013 | .......... A47J 31/3614 |
| DE | 202006014317 | | 2/2008 | |
| EP | 1676509 | | 7/2006 | |
| EP | 1676509 A1 | * | 7/2006 | .......... A47J 31/3609 |
| EP | 1867262 | | 12/2007 | |
| EP | 2314183 | | 4/2011 | |
| IT | 1676509 A1 | * | 7/2006 | .......... A47J 31/3609 |
| IT | 2314183 E | * | 11/2011 | .............. A47J 31/36 |
| WO | WO-2007046702 A2 | * | 4/2007 | .............. A47J 31/36 |
| WO | 2011151703 | | 12/2011 | |

OTHER PUBLICATIONS

Office Action issued on Dec. 1, 2018 in corresponding Australian Application No. 2015220889.
Office Action issued on Sep. 21, 2018 in corresponding EP Application No. 15704808.3.
Office Action issued on Jul. 31, 2018 in corresponding CN Application No. 201580009173.2.
Cover letter of the CN patent agent forwarding the Office Action issued on Jul. 31, 2018 in corresponding CN Application No. 201580009173.2.
Office Action issued on Jan. 2, 2020 in corresponding CN Patent Application No. 20158009173.2 and relevant reporting letter of the CN Local Agent.
Office Action issued on Jun. 13, 2019 in corresponding CN Patent Application No. 20158009173.2 and relevant reporting letter of the CN Local Agent.
International Search Report of PCT application PCT/EP2015/053361 issued on Apr. 16, 2015.
Office Action issued by the EPO on Oct. 20, 2017 for corresponding European patent application No. 15704808.3.

* cited by examiner

COFFEE MACHINE AND RELATIVE CONTROL METHOD

This application is the U.S. national phas application of internation application number PCT/EP2015/053361, filed 18 Feb. 2015, which designates the U.S. and claims priority to Italian Application No. MI2014A000249 filed 20 Feb. 2014, the contents of each of which are hereby incorporated by reference as if set forth in their entireties.

The present invention refers to a coffee machine and a control method thereof. In one type of coffee machine present on the market, the exchanger for the coffee production line is integrated in the service boiler where the steam and hot water are produced for the production of beverages and/or coffee. The feed pump supplying the coffee machine has a supply line for the service boiler and a supply line for the exchangers used for the production of coffee. Regulation of the service boiler pressure takes place by means of a pressure switch or a temperature probe that controls the electric power supply to a heating element present in the boiler. The pressure level established in the service boiler then determines the temperature of the water inside the exchanger used for the production of coffee and thus also determines the temperature of the water with which infusion is carried out in the infusion unit of the coffee machine. Water pressure for obtaining coffee is supplied by the feed pump. The quality of the cup of coffee is therefore the result of proper temperature of the water and the pressure of the water injected by the pump and regulated by the pressure switch present on the heating element located in the service boiler.

In a different type of coffee machine present on the market, the boiler for the coffee production line is separated from the service boiler where the steam is produced. In this case, each unit has its own boiler with its own dedicated heating element.

In all of these coffee machines of the prior art, there is no pressure control for the feed pump, which is simply and solely limited in maximum delivery pressure by means of a specific bypass circuit of the feed pump.

Therefore, once the temperature of the infusion water has been defined, the flow rate and pressure of the water flowing through the infusion unit cannot be controlled. In fact, the organoleptic properties of the product in a cup strongly depend on the quantity, the degree of grinding and the pressing of the dose of coffee present in the infusion chamber. Additionally, the point of operation of the feed pump depends solely on the mechanical resistance offered by the dose of coffee present in the infusion chamber.

The technical task of the present invention is therefore to make a coffee machine and a control method thereof that make it possible to eliminate the cited technical drawbacks of the prior art.

Within the scope of this technical task, an aim of the invention is to realize a coffee machine and a control method thereof that make it possible to obtain a product with the desired organoleptic properties that can be set beforehand.

Another aim of the invention is to realize a coffee machine that is highly flexible in terms of use so as to make it possible to adapt fie product to changing needs of the consumer as they arise.

The technical task, as well as these and other aims, according to the present invention, are achieved by realizing a coffee machine comprising at least one hydraulic infusion circuit comprising at least one feed pump for supplying water, at least one boiler hydraulically connected to the feed pump by cascade connection, and at least one infusion unit that is hydraulically connected to the boiler by cascade connection and through which a flow rate of water can pass for execution of an infusion cycle, characterized in that it comprises means for regulating said flow rate of water, means for measuring said flow rate, and a feedback controller connected to said regulating means and to said measuring means and configured to compare in real time the current value of the flow rate of the water, as measured by the measuring means, with a corresponding reference value, and to control the regulating means so as to eliminate any deviation of said current value with respect to said corresponding reference value.

The present invention also discloses a control method for controlling a coffee machine comprising an electronic controller and at least one hydraulic infusion circuit comprising at least one pump for supplying water, at least one boiler hydraulically connected to the feed pump by cascade connection, and at least one infusion unit that is hydraulically connected to the boiler by cascade connection and through which a flow rate of water can pass for execution of an infusion cycle, characterized in that it comprises the following preliminary steps prior to execution of an infusion cycle:

acquiring a plurality of different reference infusion cycles, in the memory of the controller, each cycle being defined by a corresponding reference time trend for the flow rate of the water that passes through the infusion unit;

acquiring a selection of a reference infusion cycle in the memory of the controller;

and in that it comprises the following steps carried out by the controller during execution of the infusion cycle:

acquiring the measurement of the current value of said flow rate of the water passing through the infusion unit comparing the current measured value with the corresponding reference value, in real time; and in the event of a detected deviation of the current measured value from the corresponding reference value provided for the selected reference infusion cycle, regulating in real time the flow rate of the water passing through the infusion unit in such a manner as to eliminate this deviation.

Other characteristics of the present invention are also defined in the claims herein below.

Figure 2:
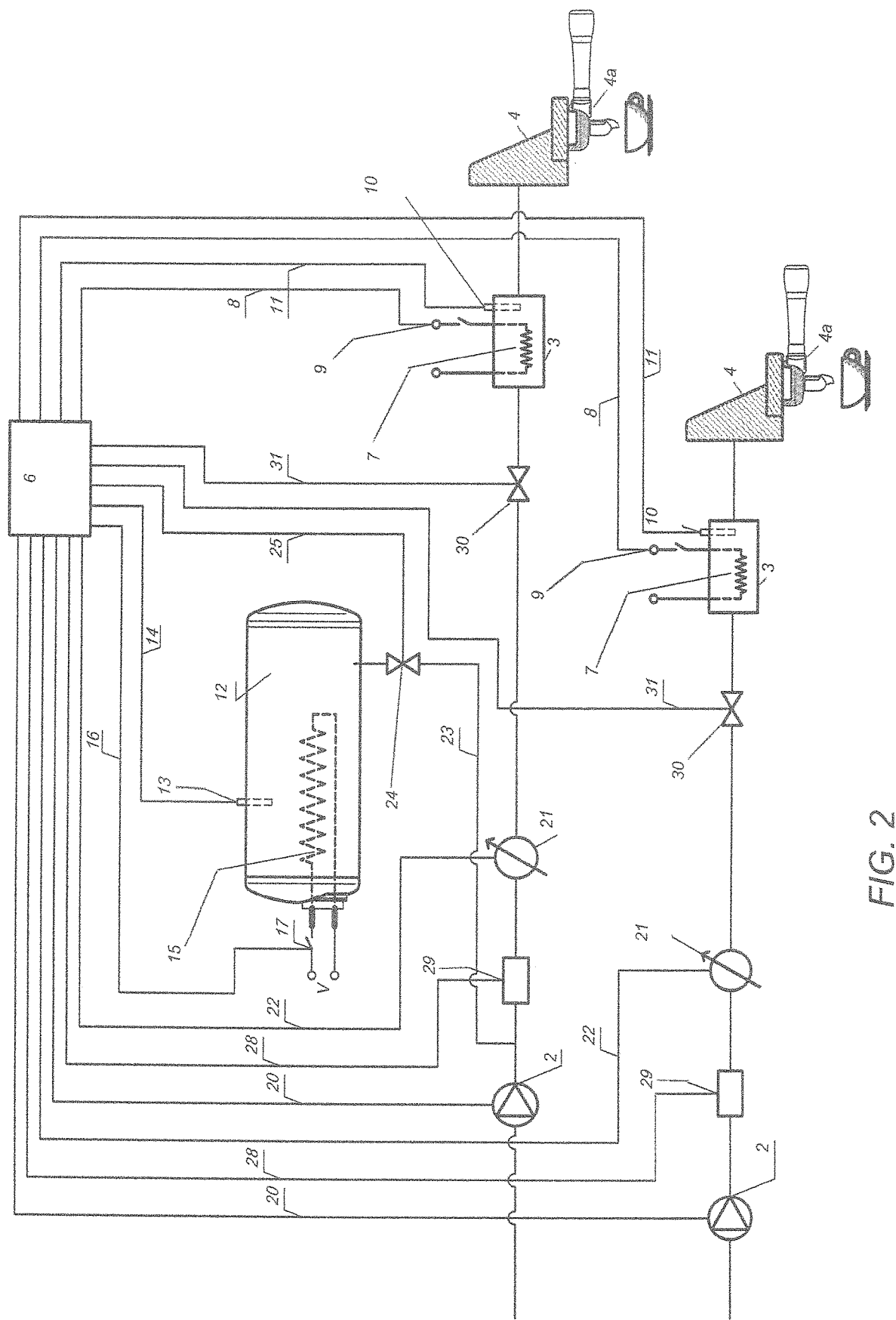

Further characteristics and advantages of the invention will become more apparent from the description of a preferred, but not exclusive, embodiment of the coffee machine and the control method thereof according to the invention, which is illustrated by way of non-limiting example in the attached drawings, of which:

FIG. 1 is a circuit diagram of a coffee machine in accordance with a first preferred embodiment of the invention; and FIG. 2 is a circuit diagram of a coffee machine in accordance with a second preferred embodiment of the invention, Equivalent parts in the different embodiments of the invention shall be indicated with the same reference number herein below.

With reference to the figures cited, a coffee machine is shown and indicated in its entirety by reference number 1.

The coffee machine 1 comprises a controller 6, for example an electronic board, and at least one hydraulic infusion circuit comprising at least one feed pump 2 for supplying water, at least one boiler 3 hydraulically connected to the feed pump 2 by cascade connection, and at least one infusion unit 4 that is hydraulically connected to the boiler 3 by cascade connection and through which a flow rate of water can pass for execution of an infusion cycle.

The infusion unit 4 is preferably of the type comprising an infusion chamber defined by a filter holder 4a suitable for containing the dose of coffee grounds for infusion and that is releasable from the machine body so as to load a dose of new coffee grounds and to unload a dose of spent coffee grounds.

In particular, each coffee machine has two hydraulic infusion circuits: in the solution illustrated in FIG. 1, the feed pump 2 is shared by the first and the second hydraulic infusion circuit, whereas in the solution illustrated in FIG. 2, each hydraulic infusion circuit has a respective dedicated feed pump 2.

Each feed pump 2 is connected by means of an electric connection line 20 to the controller 6.

Internally the boiler 3 has a temperature transducer 10 that is connected to the controller 6 by means of an electric connection line 11 and a heating element 7 that is connected to the controller 6 by means of an electric connection line 8 supplied with a switch 9 that can be controlled by the controller 6.

The coffee machine 1 further comprises a service boiler 12 used for producing steam and connected hydraulically to the feed pump 2 by means of a line 23 supplied with a solenoid feed valve 24 in the solution shown in FIG. 1, and to the feed pump 2 of one of the two hydraulic infusion circuits in the embodiment appearing in FIG. 2.

The solenoid feed valve 24 is connected to the controller 6 by means of an electric line 25.

Internally the boiler 12 has a temperature and/or pressure transducer 13 connected to the controller 6 by means of an electric connection line 14, and a heating element 15 connected to the controller 6 by means of an electric connection line 16 equipped with a switch 17 that can be controlled by the controller 6.

The coffee machine 1 also comprises regulating means for regulating the flow rate of water passing through the infusion unit 4 and measuring means for measuring the flow rate of the water passing through the infusion unit 4.

Advantageously, the controller 6 operates with feedback control as it is connected to the regulating means and to the measuring means and as it is configured to acquire, during execution of the infusion cycle, the value of the flow rate of the water, as measured by the measuring means, and to control the regulating means so as to force a real-time trend on the water flow rate during the infusion cycle, reproducing a reference trend that can be set in the controller 6.

The measuring means for each hydraulic infusion circuit comprises a flow meter 21 that is connected to the controller 6 by means of an electric connection line 22. The measuring means for each infusion circuit is positioned between the feed pump 2 and the boiler 3.

With reference to the solution illustrated in FIG. 1, the regulating means is configured to divide into parts the flow rate of water delivered by the feed pump 2. In this case, the regulating means specifically comprises a regulating solenoid valve 18 in each hydraulic infusion circuit and a bypass circuit 19 of the feed pump 2 comprising a regulating solenoid valve 32. Each regulating solenoid valve 18 is in communication with the controller 6 by means of an electric line 27. The regulating solenoid valve 32 is in communication with the controller 6 by means of an electric line 33.

With reference to the solution illustrated in FIG. 2, the regulating means is configured to regulate the flow rate of the water delivered by the feed pump 2. In this case, the regulating means is configured to change the rotational speed of the feed pump 2 and comprises for example a inverter driver (unillustrated) associated with the feed pump 2.

Each infusion circuit also has detection means for detecting the pressure of the hydraulic infusion circuit, particularly a pressure transducer 29, and said means is connected to the controller 6 by means of an electric line 28. The pressure level detected by the detection means is utilized by the controller 6 to control the regulating means in such a manner as to limit the maximum pressure of the hydraulic infusion circuit.

Lastly, each infusion circuit has a supply solenoid valve 30 positioned between the flow meter 21 and the boiler 3 and connected to the controller 6 by means of an electric line 31.

The detection means for detecting the pressure of each hydraulic infusion circuit is positioned between the feed pump 2 and the boiler 3.

The method for controlling the coffee machine for the execution of an infusion cycle comprises the following steps.

The memory of the controller 6 is preliminarily programmed with a plurality of reference infusion cycles.

In addition to utilizing the cycles stored in the memory, it shall also be possible to program a cycle with a flow rate/time graph on a display.

Each reference infusion cycle is defined by the trend provided for the flow rate of the water passing through the infusion unit 4 in the interval of time provided for execution of the reference infusion cycle.

In particular, the trend for a reference infusion cycle is defined by a function that associates a corresponding value $F_{i\text{-}rif}(t_i)$ of the flow rate of the water passing through the infusion unit 4 with each instant of time $t_i$ of the reference infusion cycle.

For example, by means of a display present on the control panel of the coffee machine, the user selects the reference infusion cycle most suited to his/her taste and activates the start button for starting an infusion cycle.

The controller 6 stores the selection made by the user in the memory and associates the preselected infusion cycle with the beverage.

The user presses the button for activation of the infusion cycle and the control cycle starts.

In fact, the controller 6 commands the preheating of the boiler 3 if the temperature of the latter is below the operating temperature and commands the activation of the feed pump 2 and the opening of the supply solenoid valve 30 when the operating temperature of the boiler 3 has been reached.

During execution of the infusion cycle, the flow meter 21 measures, over time, the value of the flow rate of the water passing through the infusion unit 4 and transmits the detected value to the controller 6.

In real time, the controller 6 compares the current measured value for the flow rate of the water passing through the infusion unit 4 with the reference value provided for the selected reference infusion cycle.

In the case in which in an instant $t_j$, there is a detected deviation of the current measured value from the corresponding reference value $F_{f\text{-}rif}(t_j)$ for the flow rate of the water passing through the infusion unit 4, the controller 6, always in real time, controls the regulating means so as to regulate the flow rate of the water passing through the infusion unit 4 in such a manner that the flow rate follows the reference trend provided for the selected reference infusion cycle in the memory of the controller 6 and associated with the preselected beverage.

The controller 6 operates with feedback control, checking the obtained result and continuing to control the regulating means until the deviation of the current measured value of the flow rate of the water passing through the infusion unit 4 from the corresponding reference value is eliminated.

With reference to the solution illustrated in FIG. 1, the flow rate of the water that passes through the infusion unit 4 is regulated by dividing into parts the flow rate delivered by the feed pump 2 running at a fixed rotational speed. In particular, the controller 6 controls the degree of aperture of the regulating solenoid valve 18 and of the regulating valve 32 with an inverse proportionality relation, in such a manner that the excess amount of the flow rate of the water delivered by the feed pump 2 is recirculated through the bypass line 19 of the feed pump 2.

With reference to the solution illustrated in FIG. 2, the flow rate of the water that passes through the infusion unit 4 is regulated by means of regulation of the flow rate of the water delivered by the feed pump 2. In particular, the flow rate of the water delivered by the feed pump 2 is regulated by varying the rotational speed of the feed pump 2 by means of a suitable driver. It is therefore possible to set the reference infusion cycle managed by the controller 6 so that the flow rate of the water that acts upon the dose of coffee grounds is exactly as planned, owing to the closed control loop determined by the control of the regulating means as a function of the measurement obtained by the flow meter.

Clearly, it shall be possible, in both circuits, to insert a library of reference infusion cycles in the machine and to select the cycle that one wishes to use for each individual type of delivery, or to receive from an external server and save in the memory, one or more reference infusion cycles suitable for achieving the quality of the coffee desired.

In this manner, the quality of the cup of coffee can be maximized for each individual dose of coffee grounds, the extraction of the coffee can be maximized and as a result, the duration of the infusion cycle may also be reduced.

The coffee machine and the control method thereof thus conceived are susceptible to numerous modifications and variants, all of which falling within the scope of the inventive concept. Moreover, all details may be replaced with other technically equivalent elements.

The materials used, as well as the dimensions, may in practice be of any type, according to needs and the state of the art.

The invention claimed is:

1. A coffee machine comprising:
   at least one hydraulic infusion circuit comprising,
     a feed pump for supplying water,
     a boiler hydraulically connected to the feed pump by cascade connection, and
     an infusion unit that is hydraulically connected to the boiler by cascade connection and through which a flow rate of hot water can pass for execution of an infusion cycle; regulating means for regulating said flow rate of hot water;
   a flow rate sensor for measuring said flow rate;
   a feedback controller connected to said regulating means and to said flow rate sensor and configured to compare in real time a current value of the flow rate of the hot water, as measured by the flow rate sensor, with a corresponding reference value, and to control the regulating means so as to eliminate any deviation of said cureent value of the flow rate of the hot water passing through the infusion unit with respect to said corresponding reference value; and
   a pressure sensor between said feed pump and said flow rate sensor for detecting a pressure of the hydraulic infusion circuit so as to keep the pressure of said hydraulic infusion circuit within pre-determined limits and under a pre-determined maximum limit, said pressure sensor being connected to said feedback controller,
   wherein the pressure detected by the pressure sensor is utilized by the feedback controller to control the flow rate within the hydraulic infusion circuit and to limit a maximum pressure of the hydraulic infusion circuit, and
   wherein the regulating means comprise a bypass circuit configured to divert at least a portion of the water provided by the feed pump upstream of the pressure sensor and the boiler, and to cause the water to be fed to the feed pump again, and
   wherein the feedback controller controls the flow rate by controlling an aperture, in an inversely proportional relationship, of a first valve positioned between the bypass circuit and the pressure sensor, and of a second valve positioned within the bypass circuit.

2. The coffee machine according to claim 1, wherein said regulating means is configured to regulate the flow rate of the water supplied by said feed pump.

3. The coffee machine according to claim 1, wherein there is a plurality of infusion units, and wherein said regulating means is configured to divide into parts the flow rate of water delivered by the feed pump for each infusion unit.

4. The coffee machine according to claim 1, wherein said flow rate sensor is positioned between said feed pump and said boiler, or positioned upstream of the feed pump.

5. The coffee machine according to claim 1, wherein said flow rate sensor is positioned between said feed pump and said boiler, or positioned upstream of said feed pump.

6. The coffee machine according to claim 5, wherein said pressure sensor is connected to said feedback controller.

7. A coffee maching comprising:
   a hydraulic infusion circuit comprising,
     a feed pump for supplying water,
     a boiler hydraulically connected to the feed pump by cascade connection, and
     an infusion unit that is hydraulically connected to the boiler by cascade connection and through which a flow rate of hot water can pass for eecution of an infusion cycle;
   regulating means for regulating said flow rate of water;
   a flow rate sensor for measuring said flow rate;
   a feedback controller connected to said flow rate regulating means and to said flow rate sensor and configured to compare in real time a current value of the flow rate of the water, as measured by the flow rate sensor, with a corresponding reference value, and to control the regulating means so as to eliminate any deviation of said current value of the flow rate of the water passing through the infusion unit with respect to said corresponding reference value, the controller being associated with a memory; and
   a pressure sensor between said feed pump and said flow rate sensor for detecting a pressure of the hydraulic circuit so as to keep the pressure of said hydraulic circuit within pre-determined limits and under a pre-determined maximum limit, said pressure sensor being connected to said feedback controller,
   wherein a pressure level detected by the pressure sensor is utilized by the feedback controller to control the flow rate within the hydraulic infusion circuit and to limit a maximum pressure of the hydraulic infusion circuit, wherein the machine is configured to allow to program an infusion cycle using a flow rate/time graph on a display, wherein the regulating means comprises a bypass circuit configured to divert at least a portion of the water provided by the feed pump upstream of the pressure sensor and the boiler, and to cause the water to be fed to the feed pump again, and wherein the feedback controller controls the flow rate by controlling an aperture, in an inversely proportional relationship, of a first valve positioned between the bypass circuit and the pressure sensor, and of a second valve positioned, within the bypass circuit, the feed pump running at a fixed rotational speed.

\* \* \* \* \*